(12) United States Patent
Sheets et al.

(10) Patent No.: US 10,225,023 B1
(45) Date of Patent: Mar. 5, 2019

(54) APPARATUS, SYSTEM, AND METHOD FOR FACILITATING INCREASED DATA TRANSMISSION SPEEDS IN SIZE-CONSTRAINED RACKMOUNT NETWORK DEVICES

(71) Applicant: Juniper Networks, Inc., Sunnyvale, CA (US)

(72) Inventors: Troy M. Sheets, San Francisco, CA (US); Terence H. Ng, Long Beach, CA (US); Cetin Diken, Palo Alto, CA (US)

(73) Assignee: Juniper Networks, Inc, Sunnyvale, CA (US)

(*) Notice: Subject to any disclaimer, the term of this patent is extended or adjusted under 35 U.S.C. 154(b) by 43 days.

(21) Appl. No.: 15/497,369

(22) Filed: Apr. 26, 2017

(51) Int. Cl.
*H04B 10/00* (2013.01)
*H04B 10/80* (2013.01)
*H05K 7/14* (2006.01)
*G02B 6/44* (2006.01)
*G02B 6/38* (2006.01)
*H04L 12/947* (2013.01)

(52) U.S. Cl.
CPC ......... *H04B 10/801* (2013.01); *G02B 6/3897* (2013.01); *G02B 6/4453* (2013.01); *H04L 49/25* (2013.01); *H05K 7/1438* (2013.01)

(58) Field of Classification Search
CPC .. H04B 10/801; G02B 6/3897; G02B 6/4453; H04L 49/25; H05K 7/1438
USPC .......................................................... 398/135
See application file for complete search history.

(56) References Cited

U.S. PATENT DOCUMENTS

| | | | | |
|---|---|---|---|---|
| 2005/0100340 A1* | 5/2005 | Nishimura | ........... | H04B 10/801 398/135 |
| 2012/0039614 A1* | 2/2012 | Miura | ................... | H04B 10/00 398/135 |
| 2013/0202288 A1* | 8/2013 | Jia | ....................... | H04B 10/801 398/15 |

* cited by examiner

*Primary Examiner* — Tesfaldet Bocure
(74) *Attorney, Agent, or Firm* — FisherBroyles, LLP

(57) ABSTRACT

The disclosed apparatus may include (1) a switch-fabric circuit board that includes at least one switch-fabric circuit that facilitates communicative connectivity between packet forwarding engines within a rackmount network device and (2) a plurality of optic circuit boards that are each communicatively connected to the switch-fabric circuit board. In this example, the optic circuit boards may include a plurality of packet forwarding engines that are communicatively connected to one another via the switch-fabric circuit and a plurality of communication ports that are each communicatively connected to at least one of the packet forwarding engines. In addition, the switch-fabric circuit board may reside between at least two of the optic circuit boards within the rackmount network device. Various other apparatuses, systems, and methods are also disclosed.

20 Claims, 7 Drawing Sheets

APPARATUS, SYSTEM, AND METHOD FOR FACILITATING INCREASED DATA TRANSMISSION SPEEDS IN SIZE-CONSTRAINED RACKMOUNT NETWORK DEVICES

BACKGROUND

Rackmount network devices (such as switches and/or routers) often include a variety of components arranged and/or distributed across multiple circuit boards. As network-device technology advances, the number of design considerations and/or constraints may increase. For example, to successfully increase data transmission speeds in rackmount network devices, design engineers may need to reduce the length of the electrical traces that provide connectivity between certain components (such as optical ports, packet forwarding engines, and/or switch fabrics) on the circuit boards within the rackmount network devices.

Unfortunately, in traditional rackmount network devices, the amount of space available on those circuit boards may be extremely limited due to size constraints associated with the devices themselves. For example, as an industry standard, a 2U rackmount switch or router may have a total height of no greater than 3.5 inches. As a result, design engineers traditionally arranged and/or distributed components like packet forwarding engines and switch fabrics on one or two Printed Circuit Boards (PCBs). However, while this traditional arrangement of components on one or two PCBs may have sufficed under lower data transmission speeds, the same arrangement may be insufficient and/or fail to function properly under higher data transmission speeds.

The instant disclosure, therefore, identifies and addresses a need for additional and improved apparatuses, systems, and methods for facilitating increased data transmission speeds in size-constrained rackmount network devices.

SUMMARY

As will be described in greater detail below, the instant disclosure generally relates to apparatuses, systems, and methods for facilitating increased data transmission speeds in size-constrained rackmount network devices. In one example, an apparatus for accomplishing such a task may include (1) a switch-fabric circuit board that includes at least one switch-fabric circuit that facilitates communicative connectivity between packet forwarding engines within a rackmount network device and (2) a plurality of optic circuit boards that are each communicatively connected to the switch-fabric circuit board. In this example, the optic circuit boards may include a plurality of packet forwarding engines that are communicatively connected to one another via the switch-fabric circuit and a plurality of communication ports that are each communicatively connected to at least one of the packet forwarding engines. In addition, the switch-fabric circuit board may reside between at least two of the optic circuit boards within the rackmount network device.

Similarly, a rackmount network device incorporating the above-described apparatus may include (1) a switch-fabric circuit board that includes at least one switch-fabric circuit that enables packet forwarding engines to have communicative connectivity with one another and (2) a plurality of optic circuit boards that are each communicatively connected to the switch-fabric circuit board. In this example, the optic circuit boards may include a plurality of packet forwarding engines that are communicatively connected to one another via the switch-fabric circuit and a plurality of communication ports that are each communicatively connected to at least one of the packet forwarding engines. In addition, the switch-fabric circuit board may reside between at least two of the optic circuit boards within the rackmount network device.

A corresponding method may include (1) communicatively connecting a plurality of optic circuit boards that each include a plurality of packet forwarding engines to a switch-fabric circuit board that includes at least one switch-fabric circuit, (2) positioning, within a rackmount network device, at least two of the optic circuit boards on opposite sides of the switch-fabric circuit board relative to one another, and then (3) securing the switch-fabric circuit board and the optic circuit boards in a stack within the rackmount network device such that the switch-fabric circuit board and the optic circuit boards remain parallel to one another during operation of the rackmount network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
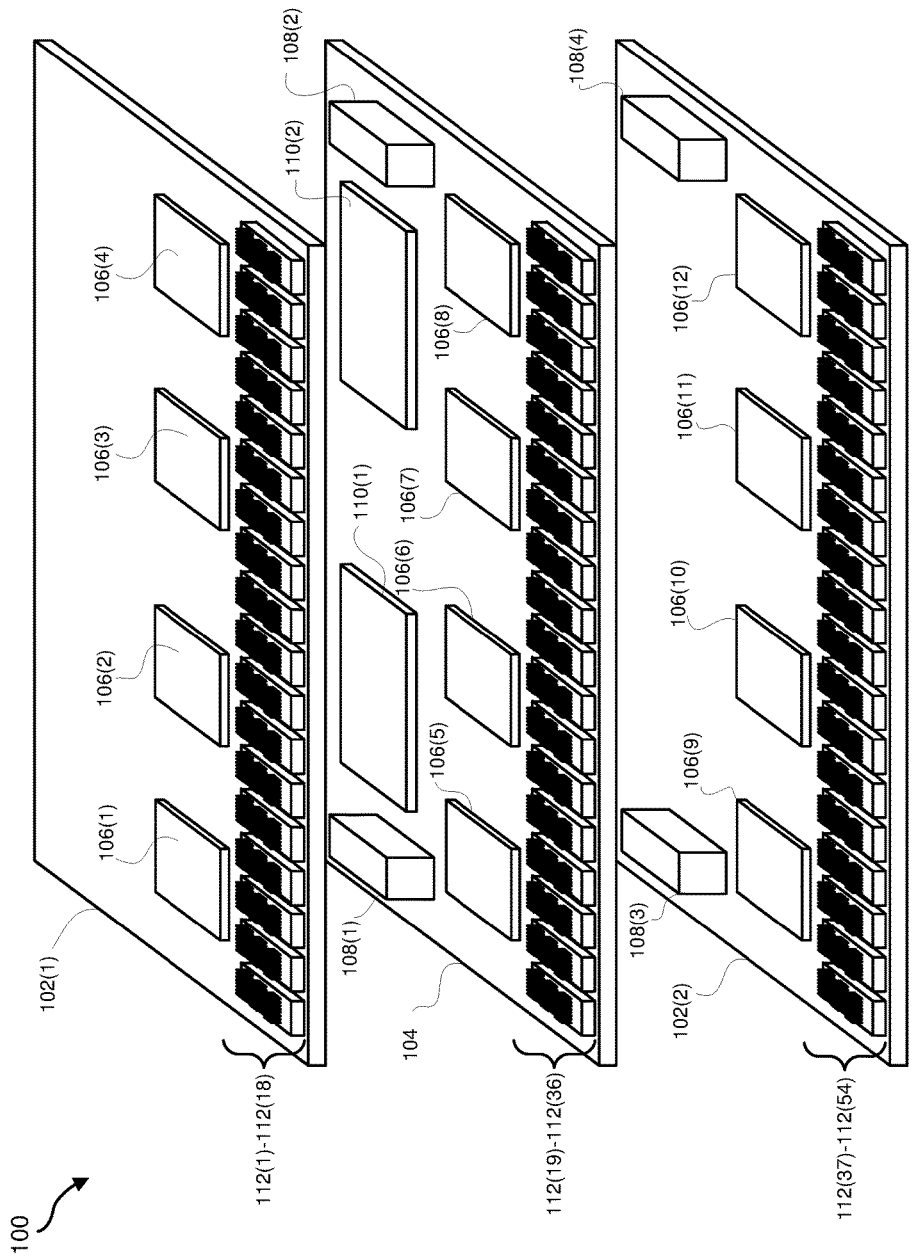
FIG. 1 is a block diagram of an exemplary apparatus for facilitating increased data transmission speeds in size-constrained network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for facilitating increased data transmission speeds in size-constrained rackmount network devices. As will be explained in greater detail below, embodiments of the instant disclosure may enable certain components (such as optical ports, packet forwarding engines, and/or switch fabrics) to be arranged and/or distributed across at least three PCBs within the size constraints of a 2U rackmount switch or router. For example, these embodiments may involve and/or call for a PCB that includes one or more switch fabrics to be placed in-between (e.g., in the middle of) two other PCBs that include various packet forwarding engines and/or optical ports.

By doing so, these embodiments may effectively provide a multi-PCB layout and/or design that facilitates reducing the length of the electrical traces between the optical ports, packet forwarding engines, and switch fabrics. As a result, this multi-PCB layout and/or design may fit within the size constraints of a 2U rackmount switch or router and also support higher data transmission speeds than traditional layouts and/or designs. Accordingly, this multi-PCB layout and/or design may enable 2U rackmount switches and/or routers to provide higher data transmission speeds that were not feasible with traditional layouts and/or designs.

FIG. 1 shows an exemplary apparatus 100 that facilitates increased data transmission speeds in size-constrained rackmount network devices. As illustrated in FIG. 1, apparatus 100 may include and/or represent a switch-fabric circuit board 104 that resides and/or is positioned between optic circuit boards 102(1) and 102(2). In this example, optic circuit board 102(1) may include packet forwarding engines 106(1), 106(2), 106(3), and 106(4) and communication ports 112(1)-(18). In one example, communication ports 112(1)-(18) may include and/or represent optical ports aligned along a single edge of optic circuit board 102(1).

Similarly, optic circuit board 102(2) may include packet forwarding engines 106(9), 106(10), 106(11), and 106(12) and communication ports 112(37)-(54). In one example, communication ports 112(37)-(54) may include and/or represent optical ports aligned along a single edge of optic circuit board 102(2).

As further illustrated in FIG. 1, optic circuit board 102(2) may also include connectors 108(3) and 108(4) that facilitate communicatively connecting optic circuit board 102(2) to switch-fabric circuit board 104. In this example, connectors 108(3) and 108(4) may interface with and/or connect to corresponding connectors (not visible in FIG. 1) that are accessible via the underside of switch-fabric circuit board 104.

As further illustrated in FIG. 1, switch-fabric circuit board 104 may include switch-fabric circuits 110(1) and 110(2), packet forwarding engines 106(5), 106(6), 106(7), and 106 (8), communication ports 112(19)-(36), and connectors 108 (1) and 108(2). In one example, switch-fabric circuits 110(1) and/or 110(2) may each include and/or represent an Application-Specific Integrated Circuit (ASIC) that facilitates communicative connectivity among at least some of packet forwarding engines 106(1)-(12) within the rackmount network device. Communication ports 112(19)-(36) may include and/or represent optical ports aligned along a single edge of switch-fabric circuit board 104.

Connectors 108(1) and 108(2) may facilitate communicatively connecting optic circuit board 102(2) to switch-fabric circuit board 104. In this example, connectors 108(1) and 108(2) may interface with and/or connect to corresponding connectors (not illustrated in FIG. 1) that are accessible via the underside of optic circuit board 102(1). In one example, connectors 108(1)-(4) may each include and/or represent a mezzanine connector.

Packet forwarding engines 106(1)-(12) may each include and/or represent an ASIC that performs switching, forwarding, and/or route-lookup functions for a rackmount network device. For example, packet forwarding engines 106(1)-(12) may process packets, apply filters or routing policies, and/or forward packets to their respective next hops on the way to their final destinations. In one example, packet forwarding engines 106(1)-(12) may be aligned in a row that runs parallel to the single edge along which the corresponding optical ports are aligned. Accordingly, and as illustrated in FIG. 1, packet forwarding engines 106(1)-(12) may be equidistant from that corresponding single edge of their respective optic circuit boards.

Additional examples of communication ports 112(1)-(54) include, without limitation, Quad Small Form-factor Pluggable (QSFP) ports, Ethernet ports, Fibre Channel ports, InfiniBand ports, CXP connectors, Multiple-Fiber Push-On/Pull-Off (MPO) connectors, XAUI ports, XFP transceivers, XFI interfaces, C Form-factor Pluggable (CFP) transceivers, variations or combinations of one or more of the same, and/or any other suitable communication ports. Communication ports 112(1)-(54) may protrude and/or project out of the housing of the rackmount network device to facilitate the insertion of communication cables (such as fiber optic cables).

In some examples, switch-fabric circuit board 104 and optic circuit boards 102(1) and 102(2) may be stacked and/or held in the arrangement shown in FIG. 1 in a variety of ways. For example, a set of brackets and/or stand-offs may stack and/or hold switch-fabric circuit board 104 and optic circuit boards 102(1) and 102(2) in this arrangement within the rackmount network device. Additionally or alternatively, connectors 108(1)-(4) may contribute to stacking and/or holding switch-fabric circuit board 104 and optic circuit boards 102(1) and 102(2) in this arrangement within the rackmount network device.

Figure 2:
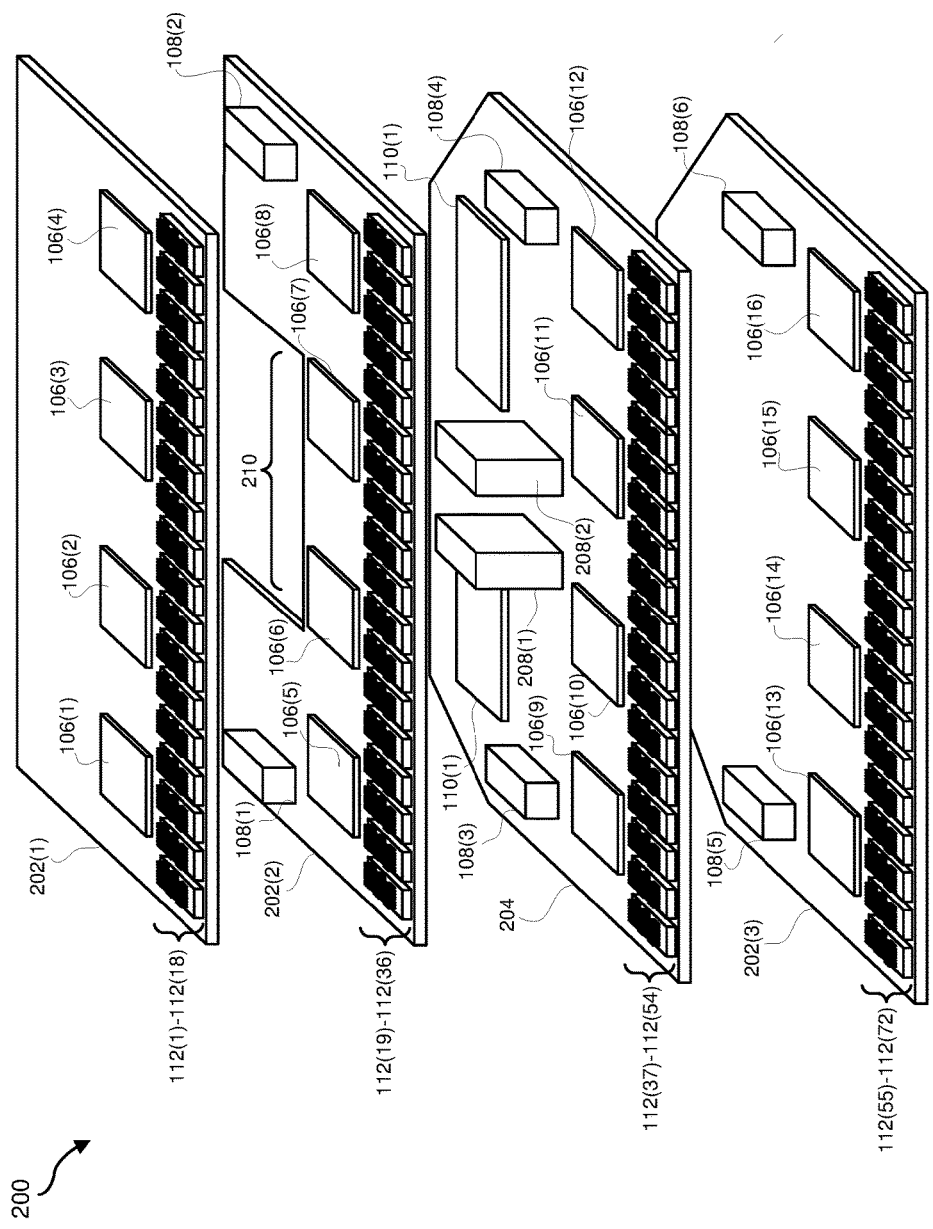
FIG. 2 is a block diagram of an exemplary apparatus for facilitating increased data transmission speeds in size-constrained network devices.

FIG. 2 shows an exemplary apparatus 200 that facilitates increased data transmission speeds in size-constrained rackmount network devices. As illustrated in FIG. 2, apparatus 200 may include and/or represent a switch-fabric circuit board 204 that resides and/or is positioned between optic circuit boards 202(2) and 202(3). In this example, apparatus 200 may also include and/or represent a circuit board 202(1) that resides and/or is positioned on the other side of circuit board 202(2) opposite switch-fabric circuit board 204. In other words, circuit board 202(1) may be positioned above circuit board 202(2), and switch-fabric circuit board 204 may be positioned below circuit board 202(3).

As further illustrated in FIG. 2, optic circuit board 202(1) may include packet forwarding engines 106(1)-(4) and communication ports 112(1)-(18). In this example, optic circuit board 202(2) may include packet forwarding engines 106 (5)-(9), communication ports 112(19)-(36), and connectors 108(1) and 108(2). In one example, connectors 108(1) and 108(2) may interface with and/or connect to corresponding connectors (not illustrated in FIG. 2) that are accessible via the underside of optic circuit board 202(1). In addition, optic circuit board 202(2) may include a cutout area 210 that serves as an opening by which connectors from switch-fabric circuit board 204 are able to bypass optic circuit board 202(2) to extend directly to and/or reach optic circuit board 202(1).

As further illustrated in FIG. 2, optic circuit board 202(3) may include packet forwarding engines 106(13)-(16), communication ports 112(55)-(72), and connectors 108(5) and 108(6). In this example, connectors 108(5) and 108(6) may interface with and/or connect to corresponding connectors (not visible in FIG. 2) that are accessible via the underside of switch-fabric circuit board 204.

As further illustrated in FIG. 2, switch-fabric circuit board 204 may include switch-fabric circuits 110(1) and 110(2), packet forwarding engines 106(9)-(12), communication ports 112(37)-(54), and connectors 108(3) and 108(4). In one example, switch-fabric circuits 110(1) and/or 110(2) may each include and/or represent an ASIC that facilitates communicative connectivity among at least some of packet forwarding engines 106(1)-(16) within the rackmount network device.

In one example, connectors 108(3) and 108(4) may interface with and/or connect to corresponding connectors (not illustrated in FIG. 2) that are accessible via the underside of optic circuit board 202(2). In addition, switch-fabric circuit board 204 may include long connectors 208(1) and 208(2) that facilitate communicatively connecting switch-fabric circuit board 204 to optic circuit board 202(1) via cutout area 210. In this example, long connectors 208(1) and 208(2) may interface with and/or connect to corresponding connectors (not illustrated in FIG. 2) that are accessible via the underside of optic circuit board 202(1). In addition, long connectors 208(1) and 208(2) may have a greater height and/or length than connectors 108(1) and 108(2).

In some examples, switch-fabric circuit board 204 and optic circuit boards 202(1)-(3) may be stacked and/or held in the arrangement shown in FIG. 2 in a variety of ways. For example, a set of brackets and/or stand-offs may stack and/or switch-fabric circuit board 204 and optic circuit boards 202(1)-(3) in this arrangement within the rackmount network device. Additionally or alternatively, connectors 108(1)-(6) and/or long connectors 208(1) and 208(2) may contribute to stacking and/or holding switch-fabric circuit board 204 and optic circuit boards 202(1)-(3) in this arrangement within the rackmount network device.

Figure 3:
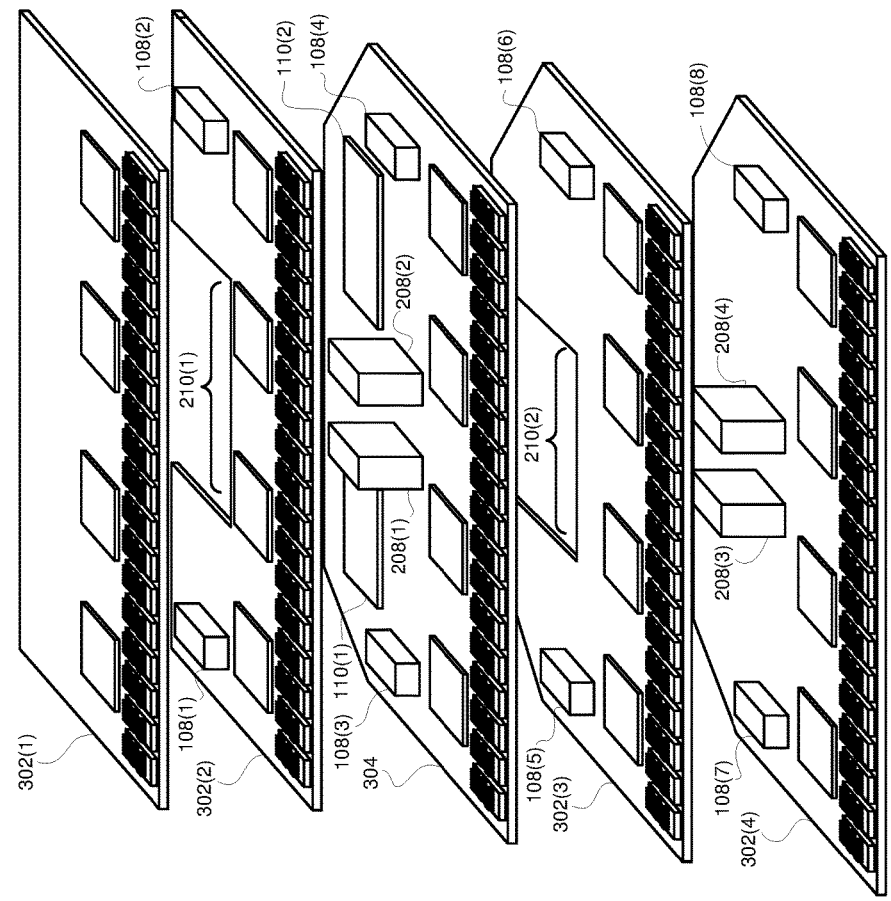
FIG. 3 is a block diagram of an exemplary apparatus for facilitating increased data transmission speeds in size-constrained network devices.

FIG. 3 shows an exemplary apparatus 300 that facilitates increased data transmission speeds in size-constrained rackmount network devices. As illustrated in FIG. 3, apparatus 300 may include and/or represent a switch-fabric circuit board 304 that resides and/or is positioned between optic circuit boards 302(2) and 302(3). In this example, apparatus 300 may also include and/or represent a circuit board 302(1) that resides and/or is positioned on the other side of circuit board 302(2) opposite switch-fabric circuit board 304. In addition, apparatus 300 may also include and/or represent a circuit board 302(4) that resides and/or is positioned on the other side of circuit board 302(3) opposite switch-fabric circuit board 304. Accordingly, switch-fabric circuit board 304 may reside and/or be positioned in the middle of optic circuit boards 302(1)-(4).

As further illustrated in FIG. 3, optic circuit board 302(1) may include various packet forwarding engines and communication ports. In this example, optic circuit board 302(2) may include various packet forwarding engines, communication ports, connectors 108(1) and 108(2), and a cutout area 210(1). In one example, connectors 108(1) and 108(2) may interface with and/or connect to corresponding connectors (not visible in FIG. 3) on the underside of optic circuit board 302(1). In addition, cutout area 210(1) may serve as an opening by which connectors from switch-fabric circuit board 304 are able to bypass optic circuit board 302(2) to extend directly to and/or reach optic circuit board 302(1).

As further illustrated in FIG. 3, optic circuit board 302(3) may include various packet forwarding engines, communication ports, connectors 108(5) and 108(6), and a cutout area 210(2). In one example, connectors 108(5) and 108(6) may interface with and/or connect to corresponding connectors (not visible in FIG. 3) on the underside of switch-fabric circuit board 304. In this example, cutout area 210(2) may serve as an opening by which connectors from optic circuit board 302(4) are able to bypass optic circuit board 302(3) to extend directly to and/or reach switch-fabric circuit board 304.

As further illustrated in FIG. 3, optic circuit board 302(4) may include various packet forwarding engines, communication ports, connectors 108(7) and 108(8), and long connectors 208(3) and 208(4). In one example, connectors 108(7) and 108(8) may interface with and/or connect to corresponding connectors (not illustrated in FIG. 3) on the underside of optic circuit board 302(3). In addition, long connectors 208(3) and 208(4) may facilitate communicatively connecting optic circuit board 302(4) to switch-fabric circuit board 304 via cutout area 210(2). In this example, long connectors 208(3) and 208(4) may interface with and/or connect to corresponding connectors (not visible in FIG. 2) on the underside of switch-fabric circuit board 304.

As further illustrated in FIG. 3, switch-fabric circuit board 304 may include switch-fabric circuits 110(1) and 110(2), various packet forwarding engines, various communication ports, connectors 108(3) and 108(4), and long connectors 208(1) and 208(2). In one example, switch-fabric circuits 110(1) and/or 110(2) may each include and/or represent an ASIC that facilitates communicative connectivity among at least some of packet forwarding engines spanning the various PCBs within the rackmount network device.

In one example, connectors 108(3) and 108(4) may interface with and/or connect to corresponding connectors (not visible in FIG. 3) on the underside of optic circuit board 302(2). In addition, long connectors 208(1) and 208(2) may facilitate communicatively connecting switch-fabric circuit board 304 to optic circuit board 302(1) via cutout area 210(1). In this example, long connectors 208(1) and 208(2) may interface with and/or connect to corresponding connectors (not visible in FIG. 3) on the underside of optic circuit board 302(1).

Figure 4:
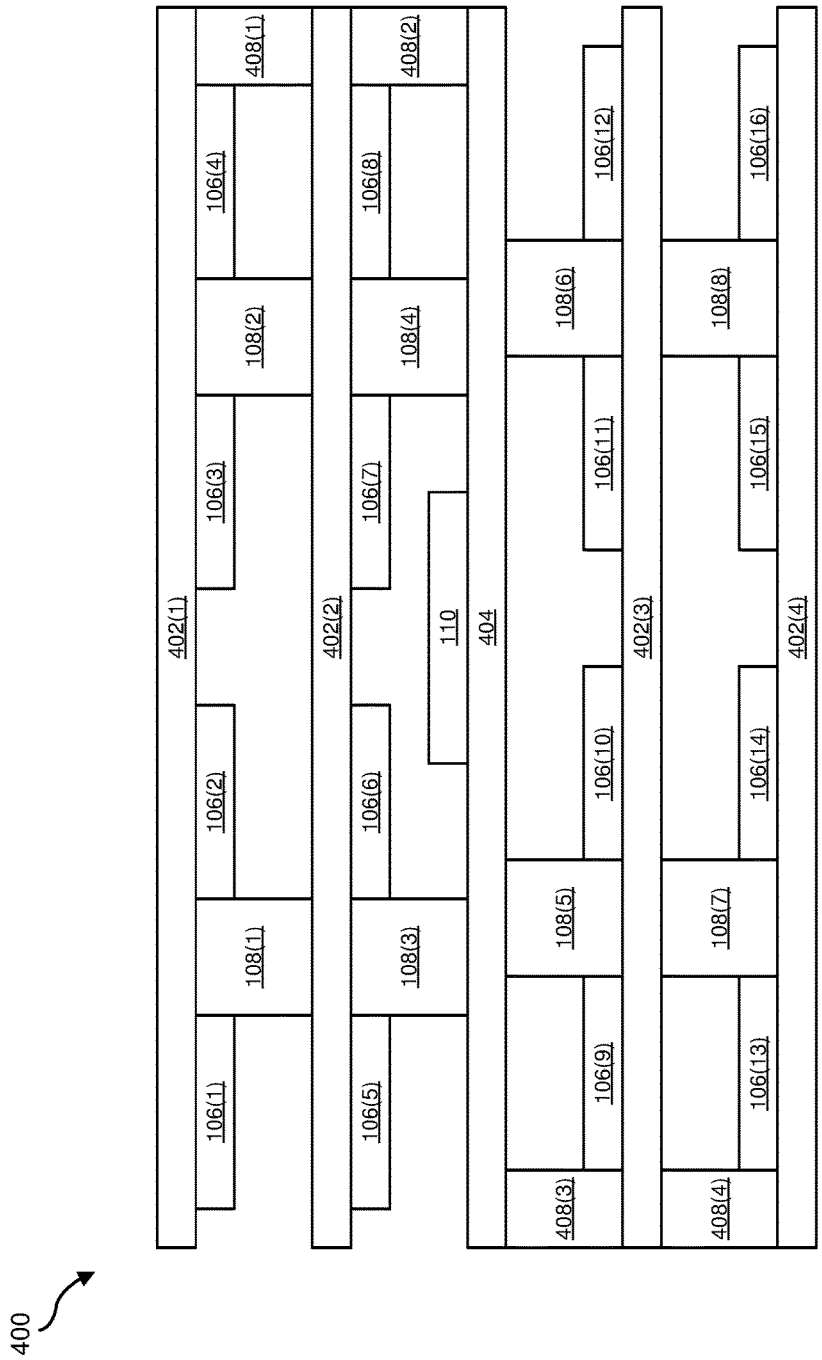
FIG. 4 is a block diagram of an exemplary apparatus for facilitating increased data transmission speeds in size-constrained network devices.

FIG. 4 shows an exemplary apparatus 400 that facilitates increased data transmission speeds in size-constrained rackmount network devices. As illustrated in FIG. 4, apparatus 400 may include and/or represent a switch-fabric circuit board 404 that resides and/or is positioned between optic circuit boards 402(2) and 402(3). In this example, apparatus 400 may also include and/or represent a circuit board 402(1) that resides and/or is positioned on the other side of circuit board 402(2) opposite switch-fabric circuit board 404. In addition, apparatus 400 may also include and/or represent a circuit board 402(4) that resides and/or is positioned on the other side of circuit board 402(3) opposite switch-fabric circuit board 404. Accordingly, switch-fabric circuit board 404 may reside and/or be positioned in the middle of optic circuit boards 402(1)-(4).

As further illustrated in FIG. 4, optic circuit board 402(1) may include packet forwarding engines 106(1)-(4) and connectors 108(1) and 108(2). In this example, connectors 108(1) and 108(2) may communicatively connect optic circuit boards 402(1) and 402(2) to one another. In one example, optic circuit board 402(1) may also include a power supply module 408(1). Power supply module 408(1) may feed power from a power source to optic circuit board 402(1).

As further illustrated in FIG. 4, optic circuit board 402(2) may include packet forwarding engines 106(5)-(8) and connectors 108(3) and 108(4). In this example, connectors 108(3) and 108(4) may communicatively connect optic circuit board 402(2) and switch-fabric circuit board 404 to one another. In one example, optic circuit board 402(2) may also include a power supply module 408(2). Power supply module 408(2) may feed power from a power source to optic circuit board 402(2).

As further illustrated in FIG. 4, optic circuit board 402(3) may include packet forwarding engines 106(9)-(12) and connectors 108(5) and 108(6). In this example, connectors 108(5) and 108(6) may communicatively connect optic circuit board 402(3) and switch-fabric circuit board 404 to one another. In one example, optic circuit board 402(3) may also include a power supply module 408(3). Power supply module 408(3) may feed power from a power source to optic circuit board 402(3).

As further illustrated in FIG. 4, optic circuit board 402(4) may include packet forwarding engines 106(13)-(16) and connectors 108(7) and 108(8). In this example, connectors 108(7) and 108(8) may communicatively connect optic circuit boards and 402(3) and 402(4) to one another. In one example, optic circuit board 402(4) may also include a power supply module 408(4). Power supply module 408(4) may feed power from a power source to optic circuit board 402(4).

As further illustrated in FIG. 4, switch-fabric circuit board 404 may include switch-fabric circuit 110. In this example, switch-fabric circuit 110 may include and/or represent an ASIC that facilitates communicative connectivity among at least some of packet forwarding engines 106(1)-(16) within a rackmount network device.

In some examples, all of optic circuit boards 402(1)-(4) may be symmetrical and/or identical to one another. However, as illustrated in FIG. 4, optic circuit boards 402(1) and 402(2) may be inverted relative to optic circuit boards 402(3) and 402(4) within the rackmount network device. By inverting optic circuit boards 402(1) and 402(2) in this way, this embodiment may enable network-device manufacturers to reduce the cost of production by fabricating identical optic circuit boards in high volume. These identical optic circuit boards may also fit together, along with the switch-fabric circuit board, within the size constraints of the rackmount network device.

Figure 5:
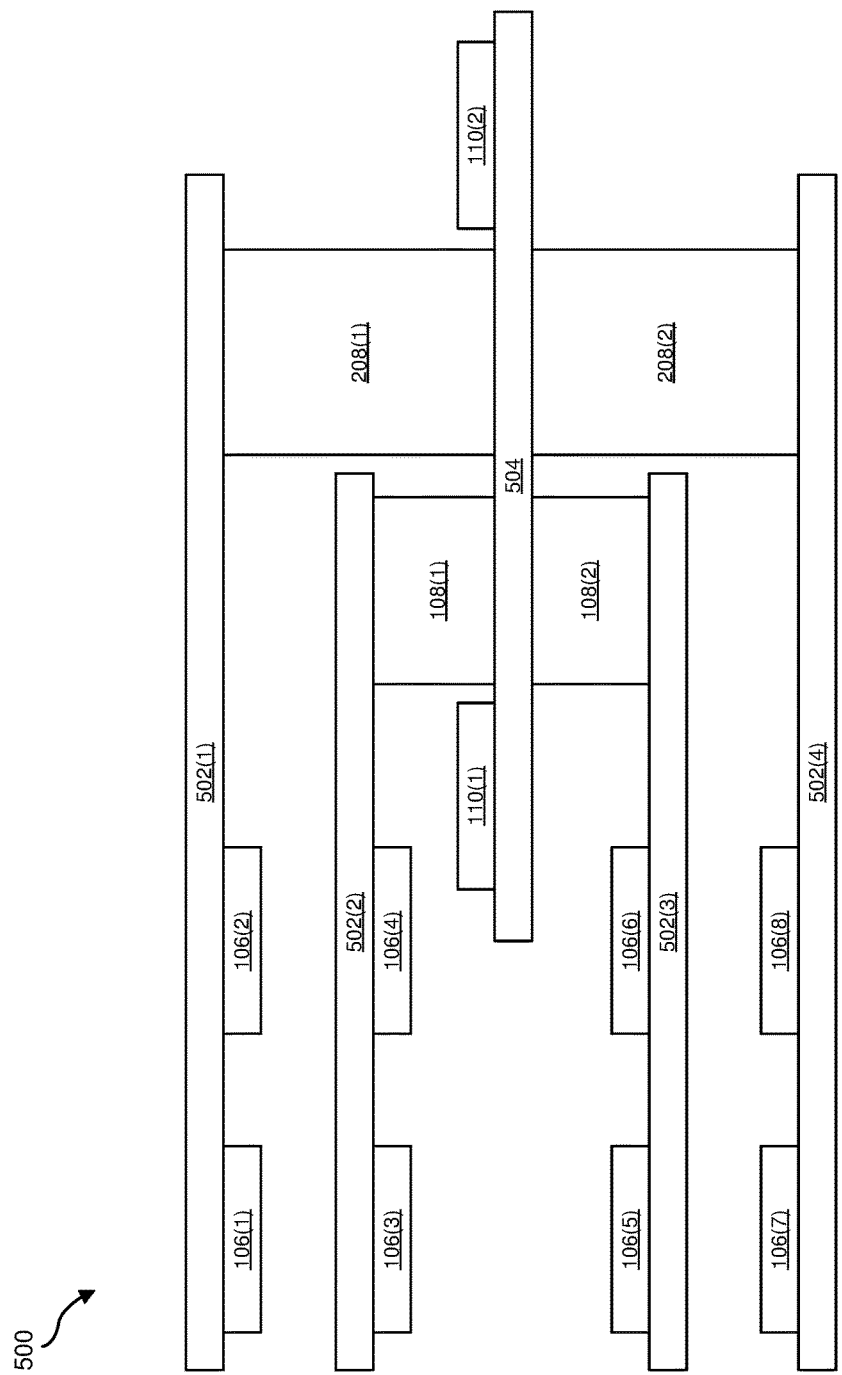
FIG. 5 is a block diagram of an exemplary apparatus for facilitating increased data transmission speeds in size-constrained network devices.

FIG. 5 shows an exemplary apparatus 500 that facilitates increased data transmission speeds in size-constrained rackmount network devices. As illustrated in FIG. 5, apparatus 500 may include and/or represent a switch-fabric circuit board 504 that resides and/or is positioned between optic circuit boards 502(2) and 502(3). In this example, apparatus 500 may also include and/or represent a circuit board 502(1) that resides and/or is positioned on the other side of circuit board 502(2) opposite switch-fabric circuit board 504. In addition, apparatus 500 may also include and/or represent a circuit board 502(4) that resides and/or is positioned on the other side of circuit board 502(3) opposite switch-fabric circuit board 404. Accordingly, switch-fabric circuit board 504 may reside and/or be positioned in the middle of optic circuit boards 502(1)-(4).

As further illustrated in FIG. 5, optic circuit board 502(1) and switch-fabric circuit board 504 may be communicatively connected to each other via connector 208(1). Similarly, optic circuit board 502(4) and switch-fabric circuit board 504 may be communicatively connected to each other via connector 208(2).

In addition, optic circuit board 502(2) and switch-fabric circuit board 504 may be communicatively connected to each other via connector 108(1). Similarly, optic circuit board 502(3) and switch-fabric circuit board 504 may be communicatively connected to each other via connector 108(2).

Figure 6:
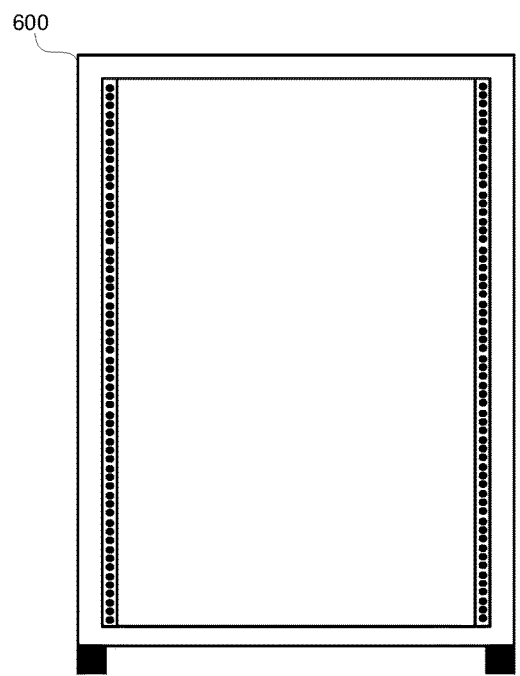
FIG. 6 is an illustration of an exemplary network rack that holds rackmount network devices.

FIG. 6 shows an exemplary network rack 600 that houses and/or holds rackmount network devices. As illustrated in FIG. 6, network rack 600 may include various holes for mounting rackmount network devices. In this example, network rack 600 may house and/or maintain rackmount network devices of various sizes. These sizes may be represented in rack units (such as 1U, 2U, 3U, 4U, 5U, etc.).

Figure 7:
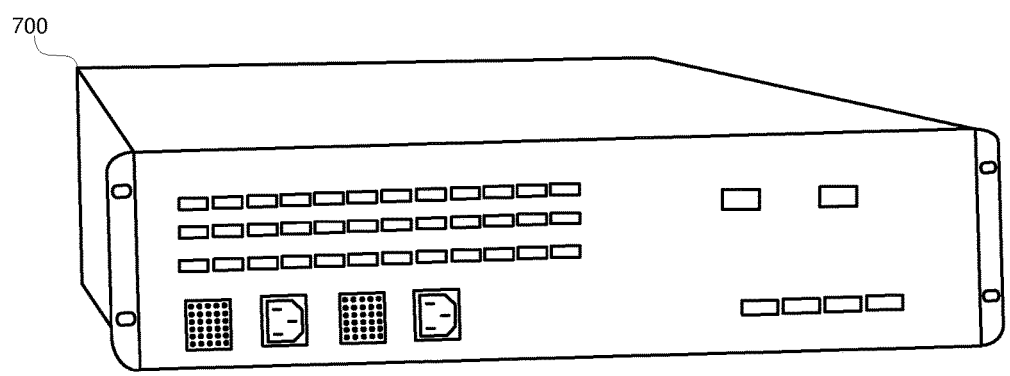
FIG. 7 is an illustration of an exemplary rackmount network device.

FIG. 7 shows an exemplary rackmount network device 700 that fits within network rack 600 in FIG. 6. As illustrated in FIG. 7, rackmount network device 700 may be configured to fit within network rack 600 in FIG. 6. Accordingly, rackmount network device 700 may be housed by network rack 600. In this example, rackmount network device 700 may represent a 2U rackmount switch or router with a maximum height of 3.5 inches. Rackmount network device 700 may house any of apparatuses 100, 200, 300, 400, and 500. In other words, rackmount network device 700 may contain all the circuit boards and corresponding components included in any one of those apparatuses.

Figure 8:
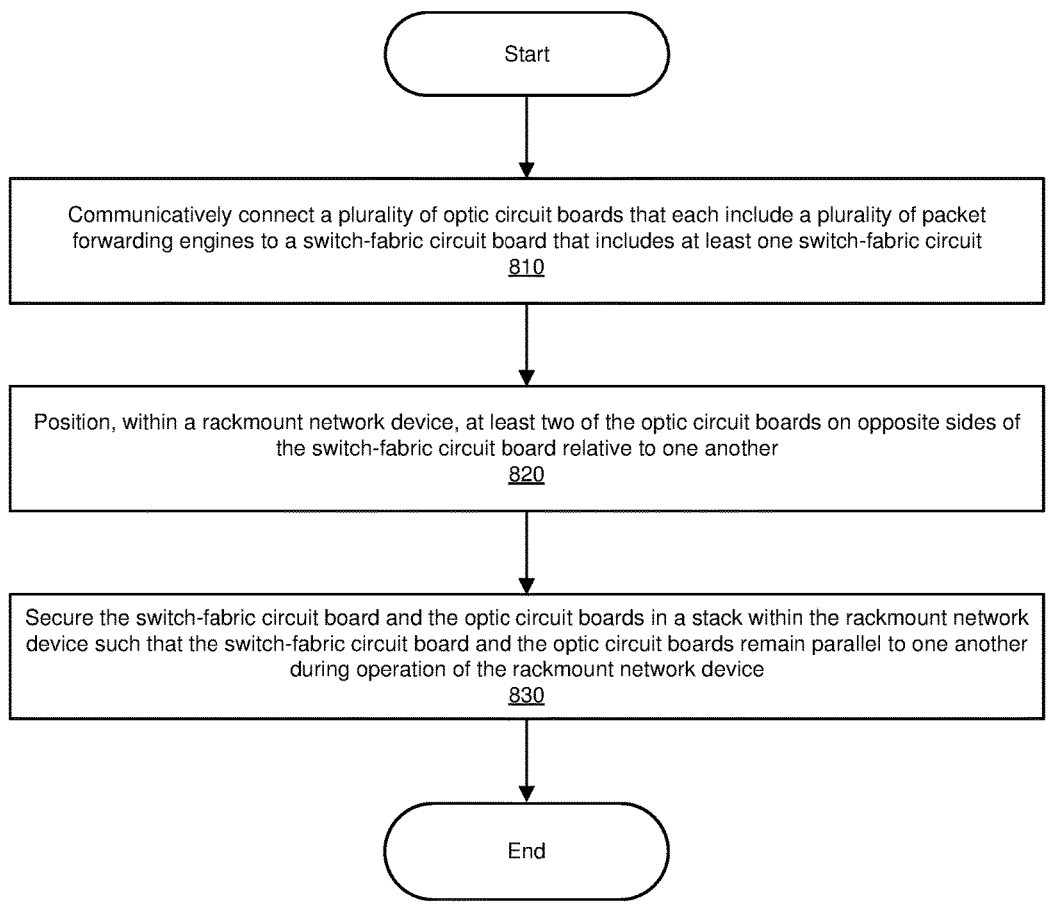
FIG. 8 is a flow diagram of an exemplary method for facilitating increased data transmission speeds in size-constrained network devices.

FIG. 8 is a flow diagram of an exemplary method 800 for facilitating increased data transmission speeds in size-constrained rackmount network devices. Method 800 may include the step of communicatively connecting a plurality of optic circuit boards that each include a plurality of packet forwarding engines to a switch-fabric circuit board that includes at least one switch-fabric circuit (810). This connecting step may be performed in a variety of ways. For example, a telecommunications equipment manufacturer may manually and/or robotically connect optic circuit boards to a switch-fabric circuit board by way of mezzanine connectors. The switch-fabric circuit board may include at least one switch-fabric ASIC that facilitates communication among several packet forwarding engines that are distributed across the optic circuit boards.

Returning to FIG. 8, method 800 may also include the step of positioning, within a rackmount network device, at least two of the optic circuit boards on opposite sides of the switch-fabric circuit board relative to one another (820). This positioning step may be performed in a variety of ways. For example, the telecommunications equipment manufacturer may position the switch-fabric circuit board in the middle of the optic circuit boards. As a result, the switch-fabric circuit board and the optic circuit boards may be stacked in parallel on top of one another. In this example, the switch-fabric circuit board may reside and/or sit in the middle of this stack within a 2U rackmount switch or router.

Returning to FIG. 8, method 800 may also include the step of securing the switch-fabric circuit board and the optic circuit boards in a stack within the rackmount network device such that the switch-fabric circuit board and the optic circuit boards remain parallel to one another during operation of the rackmount network device (830). This securing step may be performed in a variety of ways. For example, the telecommunications equipment manufacturer may secure the switch-fabric circuit board and the optic circuit boards in the parallel stack within the 2U rackmount switch or router. In this example, the telecommunications equipment manufacturer may use a set of brackets, stand-offs, and/or mounts to ensure that the circuit boards are secured.

While the foregoing disclosure sets forth various embodiments using specific illustrations, flowcharts, and examples, each illustration component, flowchart step, operation, and/or component described and/or exemplified herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

LEGEND OF REFERENCE NUMBERS FROM THE DRAWINGS

The legend shown below includes a left column and a corresponding right column. The left column includes a listing of reference numbers from the drawings. The right column includes a listing of components incorporated into the apparatuses, systems, and methods from the drawings. Each row of the left column corresponds to each row of the right column. For example, the reference number listed in one row of the left column represents the component listed in that same row of the right column.

100 Apparatus
102 Optic Circuit Board
104 Switch-Fabric Circuit Board
106 Packet Forwarding Engine
108 Connector
110 Switch-Fabric Circuit
112 Communication Ports
200 Apparatus
202 Optic Circuit Board
204 Switch-Fabric Circuit Board
208 Connector
210 Cutout Area
300 Apparatus
302 Optic Circuit Board
304 Switch-Fabric Circuit Board
400 Apparatus
402 Optic Circuit Board
404 Switch-Fabric Circuit Board
408 Power Supply Module
500 Apparatus
502 Optic Circuit Board
504 Switch-Fabric Circuit Board
600 Network Rack
700 Rackmount Network Device

What is claimed is:

1. An apparatus comprising:
a switch-fabric circuit board that includes at least one switch-fabric circuit that facilitates communicative connectivity between packet forwarding engines within a rackmount network device;
a plurality of optic circuit boards that are each communicatively connected to the switch-fabric circuit board, wherein the optic circuit boards include:
a plurality of packet forwarding engines that are communicatively connected to one another via the switch-fabric circuit; and
a plurality of communication ports that are each communicatively connected to at least one of the packet forwarding engines; and
wherein the switch-fabric circuit board resides between at least two of the optic circuit boards within the rackmount network device.

2. The apparatus of claim 1, wherein the rackmount network device has a rack size of 2 rack units (2U) and a maximum height of 3.5 inches.

3. The apparatus of claim 1, wherein the optic circuit boards are each communicatively connected to the switch-fabric circuit board by way of at least one mezzanine connector.

4. The apparatus of claim 1, wherein the switch-fabric circuit board includes at least one additional packet forwarding engine that is communicatively connected to the packet forwarding engines included on the optic circuit boards via the switch-fabric circuit.

5. The apparatus of claim 1, wherein:
the communication ports comprise a plurality of optical ports aligned along a single edge of each optic circuit board; and
on each optic circuit board, the packet forwarding engines are aligned in a row that runs parallel to the single edge along which the optical ports are aligned such that all the packet forwarding engines are equidistant from the single edge.

6. The apparatus of claim 1, wherein:
one of the optic circuit boards has a cutout area; and
the switch-fabric circuit board and the optic circuit boards are physically configured such that an additional one of the optic circuit boards is communicatively connected to the switch-fabric circuit board by at least one connector that passes from the additional one of the optic circuit boards to the switch-fabric circuit board via the cutout area of the one of the optic circuit boards.

7. The apparatus of claim 6, wherein:
the one of the optic circuit boards resides between the switch-fabric circuit board and the additional one of the optic circuit boards; and
the connector that passes from the additional one of the optic circuit boards to the switch-fabric circuit board via the cutout area has a greater height than an additional connector that communicatively connects the one of the optic circuit boards to the switch-fabric circuit board.

8. The apparatus of claim 1, wherein the plurality of optic circuit boards consists of:
two optic circuit boards;
three optic circuit boards; and
four optic circuit boards.

9. The apparatus of claim 1, wherein the two of the optic circuit boards are positioned on opposite sides of the switch-fabric circuit board relative to one another.

10. The apparatus of claim 9, wherein:
the two of the optical circuit boards are:
  each symmetrical; and
  identical to each other; and
one of the two optical circuit boards is inverted relative to another one of the two circuit boards within the rackmount network device.

11. A rackmount network device comprising:
a switch-fabric circuit board that includes at least one switch-fabric circuit that enables packet forwarding engines to have communicative connectivity with one another;
a plurality of optic circuit boards that are each communicatively connected to the switch-fabric circuit board, wherein the optic circuit boards include:
  a plurality of packet forwarding engines that are communicatively connected to one another via the switch-fabric circuit; and
  a plurality of communication ports that are each communicatively connected to at least one of the packet forwarding engines; and
wherein the switch-fabric circuit board resides between at least two of the optic circuit boards.

12. The rackmount network device of claim 11, wherein the switch-fabric circuit board and the optic circuit boards are:
stacked in parallel to one another; and
fit within a rack size of 2 rack units (2U) having a maximum height of 3.5 inches when the optic circuit boards are communicatively connected to the switch-fabric circuit board.

13. The rackmount network device of claim 11, wherein the optic circuit boards are each communicatively connected to the switch-fabric circuit board by way of at least one mezzanine connector.

14. The rackmount network device of claim 11, wherein the switch-fabric circuit board includes at least one additional packet forwarding engine that is communicatively connected to the packet forwarding engines included on the optic circuit boards via the switch-fabric circuit.

15. The rackmount network device of claim 11, wherein:
the communication ports comprise a plurality of optical ports aligned along a single edge of each optic circuit board; and
on each optic circuit board, the packet forwarding engines are aligned in a row that runs parallel to the single edge along which the optical ports are aligned such that all the packet forwarding engines are equidistant from the single edge.

16. The rackmount network device of claim 11, wherein:
one of the optic circuit boards has a cutout area; and
the switch-fabric circuit board and the optic circuit boards are physically configured such that an additional one of the optic circuit boards is communicatively connected to the switch-fabric circuit board by at least one connector that passes from the additional one of the optic circuit boards to the switch-fabric circuit board via the cutout area of the one of the optic circuit boards.

17. The rackmount network device of claim 16, wherein:
the one of the optic circuit boards resides between the switch-fabric circuit board and the additional one of the optic circuit boards; and
the connector that passes from the additional one of the optic circuit boards to the switch-fabric circuit board via the cutout area has a greater height than an additional connector that communicatively connects the one of the optic circuit boards to the switch-fabric circuit board.

18. The rackmount network device of claim 11, wherein the plurality of optic circuit boards consists of:
two optic circuit boards;
three optic circuit boards; and
four optic circuit boards.

19. The rackmount network device of claim 11, wherein the two of the optic circuit boards are positioned on opposite sides of the switch-fabric circuit board relative to one another.

20. A method comprising:
communicatively connecting a plurality of optic circuit boards that each include a plurality of packet forwarding engines to a switch-fabric circuit board that includes at least one switch-fabric circuit;
positioning, within a rackmount network device, at least two of the optic circuit boards on opposite sides of the switch-fabric circuit board relative to one another; and
securing the switch-fabric circuit board and the optic circuit boards in a stack within the rackmount network device such that the switch-fabric circuit board and the optic circuit boards remain parallel to one another during operation of the rackmount network device.

* * * * *